United States Patent [19]

Denker

[11] Patent Number: 4,737,929

[45] Date of Patent: Apr. 12, 1988

[54] HIGHLY PARALLEL COMPUTATION NETWORK EMPLOYING A BINARY-VALUED T MATRIX AND SINGLE OUTPUT AMPLIFIERS

[75] Inventor: John S. Denker, Red Bank, N.J.

[73] Assignee: American Telephone and Telegraph Company, AT&T Bell Laboratories, Murray Hill, N.J.

[21] Appl. No.: 851,237

[22] Filed: Apr. 14, 1986

[51] Int. Cl.[4] ............................ G06G 7/02; G06G 7/00; G06F 15/46

[52] U.S. Cl. ........................................ 364/807; 364/133

[58] Field of Search ............... 364/807, 602, 715, 131, 364/133; 367/105, 901

[56] References Cited

U.S. PATENT DOCUMENTS

| | | | |
|---|---|---|---|
| 4,218,768 | 8/1980 | Hassler | 367/105 |
| 4,536,844 | 8/1985 | Lyon | 364/487 |
| 4,660,166 | 4/1987 | Hopfield | 364/807 |

OTHER PUBLICATIONS

"Linear Programming on an Electronic Analogue Computer", *Trans. AIEE Part I (Comm.&Elect.)*, vol. 75, I. B. Pyne, 1956, pp. 139-143.

*Primary Examiner*—Jerry Smith
*Assistant Examiner*—Charles B. Meyer
*Attorney, Agent, or Firm*—Henry T. Brendzel

[57] ABSTRACT

Advantageous neural network realizations are achieved by employing only negative gain amplifiers and a clipped T matrix having conductances $T_{ij}$ which have only two values. Preferably, one of these values is a preselected value set by the value of a fixed resistor, and the other value is zero, created simply with an open circuit. Values for the $T_{ij}$ terms of the clipped T matrix are obtained through an iterative process which operates on the clipped and nonclipped matrices and minimizes the error resulting from the use of the clipped T matrix.

8 Claims, 3 Drawing Sheets

HIGHLY PARALLEL COMPUTATION NETWORK EMPLOYING A BINARY-VALUED T MATRIX AND SINGLE OUTPUT AMPLIFIERS

BACKGROUND OF THE INVENTION

This relates to apparatus for parallel processing of signals.

Recently, advances in the computational circuits art have brought to the forefront a class of highly parallel computation circuits that solve a large class of complex problems in analog fashion. These circuits comprise a plurality of amplifiers having a sigmoid transfer function and a resistive feedback network that connects the output of each amplifier to the input of the other amplifiers. Each amplifier input also includes a capacitor connected to ground and a resistor connected to ground, which may or may not include a capacitance and a conductance in addition to the parasitic capacitance and conductance. Input currents are fed into each amplifier input, and output is obtained from the collection of output voltages of the amplifiers.

A generalized diagram of this circuit is shown in FIG. 1, depicting amplifiers 10, 11, 12, 13 and 14 with positive and negative outputs $V_1$, $V_2$, $V_3$, $V_4$, and $V_n$, respectively. Those outputs are connected to an interconnection block 20 which has output lines 41-45 connected to the input ports of amplifiers 10-14, respectively. Within interconnection block 20, each output voltage $V_i$ is connected to each and every output line of block 20 through a conductance (e.g., resistor). For convenience, the conductance may be identified by the specific output line (i.e., source) that is connected by the conductance to a specific voltage line. For example, $T_{21}^+$ identifies the conductance that connects the non-inverting output $V_2$ to the input of the first amplifier (line 41).

Also connected to each amplifier input port is a parallel arrangement of a resistor and a capacitor with their second lead connected to grounded, and means for injecting a current (from some outside source) into each input port.

Applying Kirchoff's current law to the input port of each amplifier i of FIG. 1 yields the equation:

$$C_i (du_i/dt) = -U_i/R_i + \sum_j (T_{ij}^+ - T_{ij}^-)(V_j - U_i) + I_i \qquad (1)$$

where $C_i$ is the capacitance between the input of amplifier i and ground, $1/R_i$ is the equivalent resistance and it equals $$\frac{1}{\rho_i} + \sum_j \frac{1}{R_{ij}},$$

where $\rho_i$ is the resistance between the input of amplifier i and ground, $U_i$ is the voltage at the input of amplifier i, $T_{ij}^+$ is the a conductance between the non-inverting output of amplifier j and the input of amplifier i, $T_{ij}^-$ is the a conductance between the inverting output of amplifier j and the input of amplifier i, $V_j$ is the positive output voltage of amplifier j, related $U_j$ by the equation $V_j=g_i(U_j)$, and $I_i$ is the current driven into the input port of amplifier i by an external source.

When $T_{ij}^+$ and $T_{ij}^-$ are disjoint, $T_{ij}^+-T_{ij}^-$ may for convenience be expressed as $T_{ij}$, and it is well known that a circuit satisfying Equation (1) with symmetric $T_{ij}$ terms is stable. It is also well known that such a circuit responds to applied stimuli, and reaches a steady state condition after a short transition time. At steady state, $dU_i/dt=0$ and $dV_i/dt=0$.

With this known stability in mind, the behavior of other functions may be studied which relate to the circuit of FIG. 1 and involve the input signals of the circuit, the output signals of the circuit, and/or the circuit's internal parameters.

Indeed, in a copending application entitled Optimization Network for the Decomposition of Signals, by J. J. Hopfield, a function was studied that has the form $$E = -\frac{1}{2} \sum_i \sum_j T_{ij} V_i V_j + \sum_i (1/R_i) \int_O^{V_i} g_i^{-1}(V)dV - \sum_i I_i V_i. \qquad (2)$$

It is observed in this copending application that the integral of the function $g_i^{-1}(V)$ approaches 0 as the gain of amplifier i approaches infinity. It is also shown in the Hopfield application that the time derivative of the function E is negative, and that it reaches 0 when the time derivative of voltages $V_i$ reaches 0. Since equation (1) assures the condition of $dV_i/dt$ approaching 0 for all i, the function E of equation (2) is assured of reaching a stable state. The discovery of this function E led to the use of the FIG. 1 circuit in problem solving applications (such as the classic traveling salesman problem), in associative memory applications, and in decomposition problems (as disclosed in another copending application, by J. J. Hopfield and D. W. Tank, titled Optimization Network for the Decomposition of Signals).

The FIG. 1 circuit can solve problems which can be structured so that the the function to be minimized has at most second order terms in some parameters of the problem to permit correspondence to Equation (2). Other problems, however, may required the minimization of equations that contain terms of order higher than two. Those problems are solvable through the use of inter-neuron amplifiers, as described in still another copending application filed on even data herewith, entitled "A Highly Parallel Computation Network With Means for Reducing the Algebraic Degree of the Objective Function".

In each one of above, the $T_{ij}^+$ and the $T_{ij}^-$ are conductances that assume different values, which are a function of the problem to be solved. But, in some applications mathematical niceties take a back seat to physical realities. In particular, in most physical systems, there is a relatively limited dynamic range for the values that $T_{ij}$ can conveniently assume. It is important to be able to construct these highly parallel interactive circuits with a limited repertoire of $T_{ij}$ conductances. An additional substantial benefit would result from the use of only two-valued conductances in that the amplifiers employed in the neural network can dispense with the positive output altogether. This would permit the use of amplifiers that are smaller, and allow the construction of the neural networks with fewer leads. The latter benefit would be substantial because it is the number of leads to and from the conductance matrix that, most often, is the limiting factor in the construction of large neural networks.

SUMMARY OF THE INVENTION

Advantageous neural network realizations are achieved in accordance with the principles of my invention by employing negative gain amplifiers that possess a single output, and a clipped T matrix having conductances $T_{ij}$ which have only two values: either a value set by a fixed resistor, or an open circuit. Values for the $T_{ij}$ terms of the clipped T matrix are obtained through an iterative process which operates on the clipped and nonclipped matrices and minimizes the error resulting from the use of the clipped T matrix.

DETAILED DESCRIPTION

Figure 1:
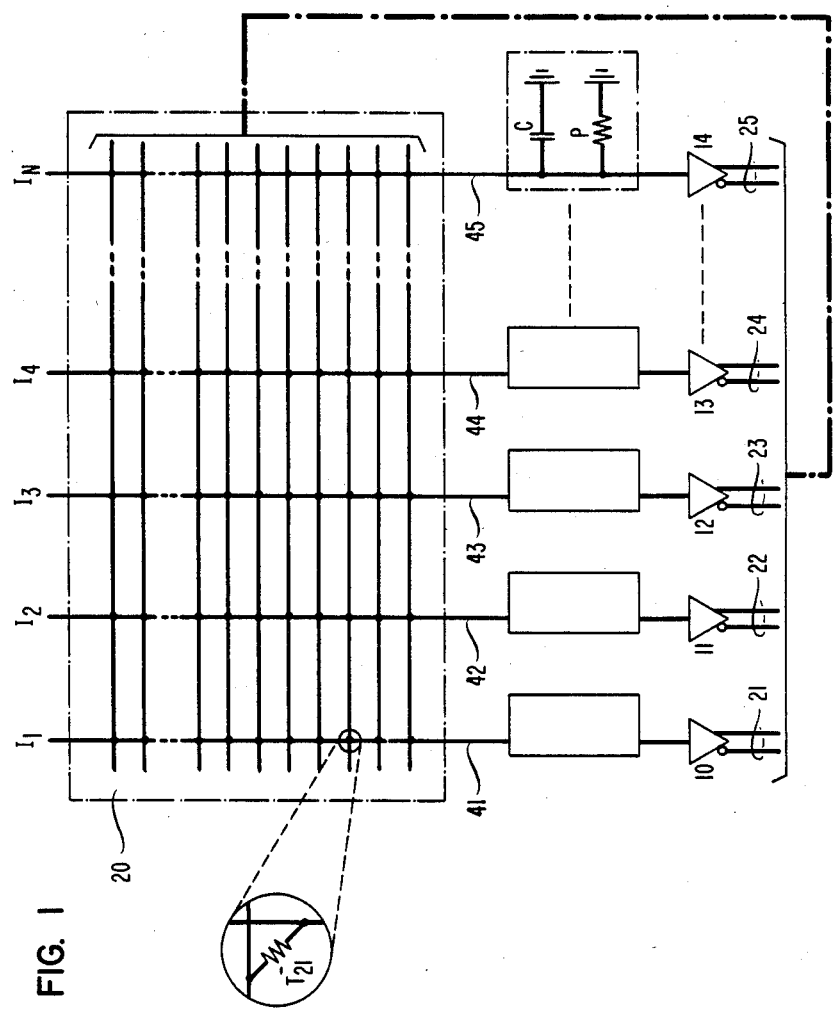
FIG. 1 depicts the canonical structure of neural networks.

Hopfield showed that the energy E given in equation (2) is a Lyapunov function of the FIG. 1 circuit. That means simply that since the $V_i$ voltages obey the equations of motion of the FIG. 1 circuit, they will change in such a way that $E(V)(t))$ is a non-increasing function of time. Since E is bounded below, it must converge.

Hopfield further showed that the system necessarily converges to a limit point (generally a local minimum of the energy surface) where the neural voltages, $V_i$, are constant in time. This is in contrast to other systems in physics, where the system might converge to a limit cycle (like the perpetual orbit of a planet) where the Lyapunov function no longer decreases but the coordinates continues to change in time. A symmetric neural network has only limit points, while a non-symmetric network can have limit cycles.

Still further, it has also been shown in the aforementioned Hopfield applications that the dynamics of the FIG. 1 circuit tend to change the $V_i$ voltages toward patterns that represent local stable minima of the energy function. These characteristic of the neural network points to its application as a content addressable memory. Indeed, it can be shown that the system of FIG. 1 and the energy function of equation (2) cooperate analogously to a massless marble rolling through a viscous fluid down an energy function. In this analogy, equation (2) is the energy function, and the different output voltages of the neural circuit are the components of a vector specifying the position of the marble in a multi-dimensional space. With this analogy in mind it can be observed that when the (energy function has low spots (which correspond to remembered points), the marble placed at some arbitrary position will roll down to a low spot and stop, along a trajectory of steepest descent.

Figure 2:
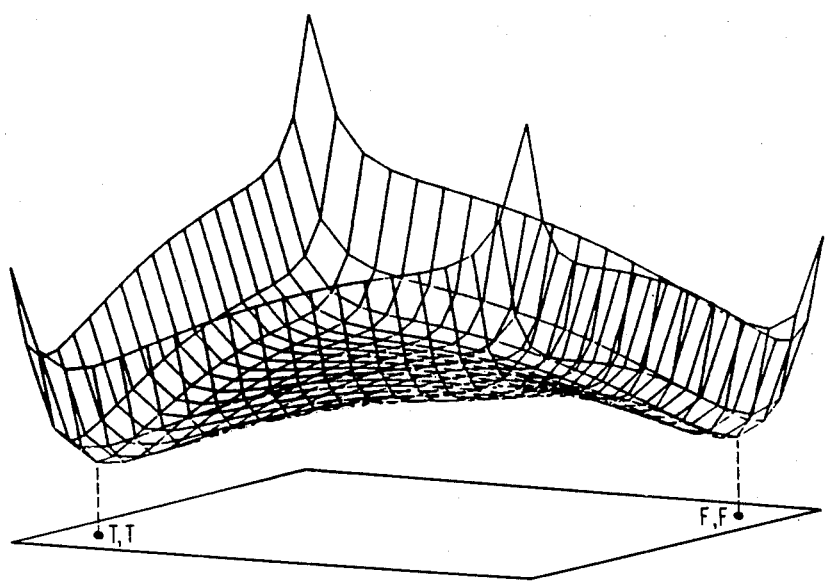
FIG. 2 illustrates an energy function having two local minima.

FIG. 2 illustrates an energy function in three dimensions which is arranged to have two local minima: one at (T,T) and one at (F,F). It can intuitively be observed that the energy function of FIG. 2 has one watershed area which directs the marble to point (T,T), and one watershed area which directs the marble to point (F,F). These low spots can be defined in terms of the voltage coordinate sets and can be viewed as memory vectors, $V^I$, each having N components, where N is the dimensionality of the energy function or, viewed in physical terms, where N is the number of amplifiers in the neural network.

The above highlights the fact that, in connection with the FIG. 1 circuit, a given energy function can have local minima and the fact that one can use these local minima to create a content addressable memory. What it implies is that it is possible to start with a given set of desired memory states, or memory vectors, and that a conductance matrix can be developed to provide a set of local minima that would correspond to the desired memories. Indeed, this is the case.

One approach for developing the $T_{ij}$ matrix values follows the teachings of D. O. Hebb in *The Organization of Behavior*, Wiley, N.Y. (1949). In accordance with this approach, memory vectors, $V^A$, $V^B$, $V^C$, ..., may be incorporated within the energy function by selecting the $T_{ij}$ terms in accordance with the equation $$T_{ij} = V_i^A V_j^A + V_i^B V_j^B + V_i^C V_j^C + \ldots \quad (3)$$

This rule creates a set of $T_{ij}$ terms when all of the memory vectors are known. There is also a variation on this rule which is incremental, in the sense that is possible to teach an old network new memories. Starting with a matrix $T_{ij}^{AB}$ that remembers states A and B, an additional memory state can be inculcated into the matrix through a modification of the old matrix in accordance with the equation $$T_{ij}^{ABC} = T_{ij}^{AB} + V_i^C V_j^C \quad (4)$$

This approach is quite good, except that it develops a matrix that is sensitive to the level of correlation that exists between the memory vectors. When the vectors are orthogonal the performance is good, but when the vectors are correlated the performance may be poor. A better rule is one where $$T_{ij}^{ABC} = T_{ij} + V_i^+ V_j^C \quad (5)$$

where $V_i^+ = (V_i^C - V_i^*)$, and $$V_i^* = T_{ij}^{AB} V_j^C \quad (6)$$

This rule is superior to the Hebb rule because it performs well even when the memory vectors are correlated. Unfortunately, it is non-symmetric and non-commutative. The last memory presented tends to trample the others. A refinement of this rule is $$T_{ij}^{ABC} = T_{ij}^{AB} + \Gamma V_i^+ V_j^C \quad (7)$$

where $\Gamma < 1$. Because $\Gamma$ is less than one, the network learns only partially each time it is taught. If the list of desired memories is presented over and over again (preferably in random order) it can be shown that the conductance matrix of $T_{ij}$ values will converge sensibly.

A rule that not only performs the appropriate interpolation but also possesses a nice geometric interpretation is $$T_{ij}^{ABC} = \frac{V_i^+ V_j}{V^+ \cdot V^+} \quad (8)$$

where the dot between the V+ terms in the denominator indicates a dot product divided by N (where N is the dimensionality of the $V^+$ vector). A further improvement of the above results from $$T_{ij}^{ABC} = \Gamma \frac{V_i + V_j^*}{V^+ \cdot V^+} \quad (9)$$

where, as before, $\Gamma < 1$.

The $T_{ij}$ values developed by the rules described above can, in principle, assume any positive or negative value. Positive conductance values, designated above by $T_{ij}^+$, are realized with resistors of appropriate value connected between the positive, or non-inverting, output of the relevant FIG. 1 amplifiers and the input of the other relevant amplifiers. Negative conductance values, designated above by $T_{ij}^-$, are realized with resistors of appropriate value connected between the negative or inverting output of the relevant FIG. 1 amplifiers and the input of the other relevant amplifiers.

It is of great benefit to be able to construct neural networks with a limited set of conductance values. It is of even greater benefit when such a set has only two members: "on" and "off", or a fixed conductance and a zero conductance. This greater benefit results from two facts: (1) it is easier to manufacture a circuit when only a single value of conductances needs to be created, and (2) when only a two valued conductance is used, one of the amplifier outputs can be dispensed with. Most advantageously, the positive, or non-inverting output is the one that is dropped, leaving physically smaller amplifiers (taking up less VLSI "real estate") and *half as many* amplifier output leads which must be routed to, and through, the matrix. Since the leads making up the matrix comprise the bulk of the matrix, a reduction in the number of leads by a factor of two results in a matrix that is essentially half as big as otherwise.

The truncation of the original, full dynamic range, matrix $T_{ij}$ to a clipped matrix $T_{ij}'$ where the values have only two values follows a repetitive process where each of the memory vectors to be stored is considered and, based on this consideration, a clipped matrix is developed. After repetitive trials at learning all of the memory vectors the clipped matrix represents a good energy function.

The sequence for developing the clipped matrix $T_{ij}$ is as follows. For each memory vector, $V^A$, compute $$V_i^+ = (V^A - T_{ij}' V_j^A) \quad (10)$$

and based on the above, compute $$T_{ij} = \text{sign}\left(T_{ij} + \Gamma \frac{V_i^+ V_j^+}{V^+ \cdot V^+}\right). \quad (11)$$

An alternative to equation (10) is $$T_{ij}' = \text{sign}(T_{ij} + \Gamma V_i^+ V_j^A). \quad (12)$$

Figure 3:
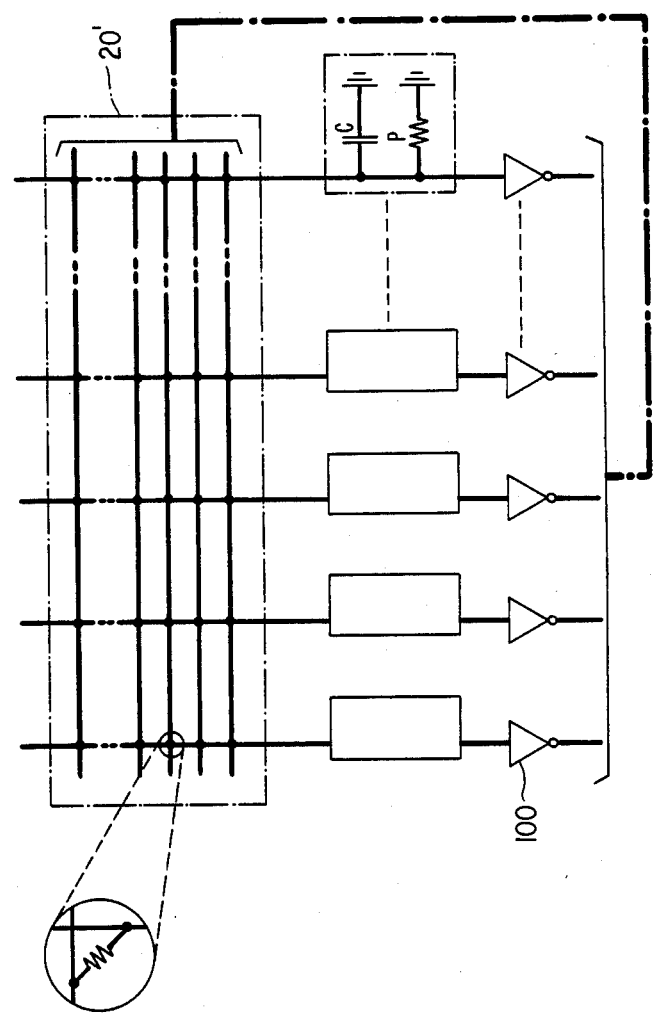
FIG. 3 shows the structure of neural networks embodying the principles of my invention.

This approach works well when some of the vectors are not fixed points. When that is the case, execution of the steps specified by equations (10) and (11), or (10) and (12), over all of the memory vectors changes the matrix at each iteration by a small amount $\Gamma$. Repetition of the above steps causes the clipped matrix to converge to some average, compromise value. When an iteration introduces no additional changes to the matrix $T_{ij}'$, the process stops and the $T_{ij}$ values of the clipped matrix are inserted into the FIG. 3 network.

Of course, the clipping does not have to be done in accordance with the "sign" function, i.e., the function $y = \text{sign}(x)$. In fact, one can use many other functions, such as $y = \text{sign}(x-1)/2$, which still is a step function; or a ramp function that allows the $T_{ij}$ terms to reside within a preselected interval, or range of values.

The above-described steps for developing a clipped matrix $T_{ij}'$ are but two of the means for realizing my invention. A small number of specific equations were provided, but it is clear that other equations can serve equally well and are within the scope of my invention.

What is claimed is:

1. A neural network for developing output signal vectors belonging to a preselected set of signals responsive to input currents approximating said output signal vectors comprising:
   a plurality of amplifiers, each having an input and an inverting output;
   means for applying said input currents to said input of each of said amplifiers; and
   an interconnection matrix, connecting said output of each of said amplifiers to each of said inputs with a conductance that is either of a first preselected value or of a second preselected value, forming a collection of condutances that are related to said set of output signal vectors.

2. The network of claim 1 wherein one of said preselected values is essentially zero.

3. A neural network for minimizing an energy function having a plurality of local minima comprising:
   a plurality of amplifiers, each having an input and an inverting output;
   means for applying input currents to the input of each of said amplifiers; and
   an interconnection matrix, connecting the non-inverting output of each of said amplifiers to each said inputs with a conductance $T_{ij}'$ that is either of a first preselected value or of a second preselected value, where said $T_{ij}'$ represents the conductance between the output of the ith amplifier and the input of the jth amplifier and where said $T_{ij}'$ conductances are selected to create said plurality of local minima at which said network is at equilibrium.

4. The network of claim 3 wherein said conductances are selected in accordance with a procedure of developing a set of multi-level $T_{ij}$ values that create an energy function having said plurality of local minima, and of repetitively computing $T_{ij}'$ values which are truncated representations of the selected expression $(T_{ij} + \Gamma V_i^+ V_j^A)$, where $\Gamma$ is less than one, $V_1^+$ equals $(V^A - T_{ij}'' V_j^A)$, $T_{ij}''$ is the $T_{ij}'$ from the previous repetition, and $V_j^A$ is the jth component of one of said local minima, said computing of $T_{ij}'$ being done over all of said minima.

5. The network of claim 4 wherein said truncated representation is realized by recognizing the sign of said selected expression.

6. The network of claim 3 wherein said conductances are selected in accordance with a procedure of developing a set of multi-level $T_{ij}$ values that create an energy function having said plurality of local minima, and of repetitively computing $T_{ij}'$ values which are truncated representations of the selected expression $$\left(T_{ij} + \Gamma \frac{V_i^+ V_j^+}{V^+ \cdot V^+}\right),$$

where $\Gamma$ is less than one, $V_i^+$ equals $(V^A - T_{ij}'' V_j A)$, $T_{ij}''$ is the $T_{ij}'$ from the previous repetition, and $V_j^A$ is the jth component of one of said local minima, said computing of $T_{ij}'$ being done over all of said minima.

7. The network of claim 6 wherein said truncated representation is realized by recognizing the sign of said selected expression.

8. A neural network for developing output signal vectors belonging to a preselected set of signals $V^A$, $V^B$, $V^C$..., each $V^i$ comprising a plurality of components and said set of signals being developed in response to applied input currents that approximate said set of signals comprising:
 a plurality of amplifiers, each having an input and an inverting output, and each of said outputs comprising one of said components;
 means for applying said input currents to said input of each of said amplifiers; and
 an interconnection matrix, connecting said output of each of said amplifiers to each of said inputs with a conductance that is within a preselected limited range of values that is related to a dot product of said set of signal values.

* * * * *